(12) United States Patent
Magnusson

(10) Patent No.: US 6,338,448 B1
(45) Date of Patent: Jan. 15, 2002

(54) MAGNETIC TAPE SPLICING FOR REDUCING TAPE PACK DISTORTION

(75) Inventor: Steven L. Magnusson, Boulder, CO (US)

(73) Assignee: Exabyte Corporation, Boulder, CO (US)

( * ) Notice: Subject to any disclaimer, the term of this patent is extended or adjusted under 35 U.S.C. 154(b) by 0 days.

(21) Appl. No.: 09/617,000

(22) Filed: Jul. 14, 2000

(51) Int. Cl.$^7$ .............................................. G11B 23/087
(52) U.S. Cl. ........................ 242/341; 360/132; 360/134
(58) Field of Search ................................. 242/341, 348, 242/532.1, 582; 360/132, 134

(56) References Cited

U.S. PATENT DOCUMENTS

| | | |
|---|---|---|
| 4,180,181 A | 12/1979 | Brandwein |
| 5,692,699 A | 12/1997 | Weirauch et al. |
| 5,996,927 A | 12/1999 | Weirauch et al. |

*Primary Examiner*—John Q. Nguyen
(74) *Attorney, Agent, or Firm*—Nixon & Vanderhye, P.C.

(57) ABSTRACT

A pack of magnetic recording tape (100) comprises a splicing tape (120) which adheres a web of a magnetic tape (122) to a leader (124). The leader (124) attaches to a reel hub (126) around which the tape is to be wound. The length L of the splicing tape in a direction parallel to an elongate dimension (127) of the magnetic tape is on the order of $N\pi D$, where D is the diameter of reel hub and N is an integer. In one embodiment, the length L of splicing tape is just slightly less than the circumference of the reel hub. The tape assembly comprising the combination of the magnetic tape, the leader, and the splicing tape greatly reduces the amount of permanent tape deformation, and provides a more efficient tape pack with smaller discontinuities. Consequentially, the stress on the magnetic tape is greatly reduced, which reduces the amount of permanent deformation and the number of magnetic tape layers that are affected by the deformations. This minimizes the area of the magnetic tape that may be rendered unusable. The tape pack (100) can be utilized in a magnetic tape cassette or cartridge (140), which can be either a dual reel cartridge or a single reel cartridge.

7 Claims, 3 Drawing Sheets

MAGNETIC TAPE SPLICING FOR REDUCING TAPE PACK DISTORTION

This application is related to simultaneously-filed U.S. patent application Ser. No. 09/617,506 entitled "MAGNETIC TAPE SPLICING FOR REDUCING TAPE PACK DISTORTION" which is incorporated herein by reference.

BACKGROUND

1. Field of the Invention

The present invention pertains to magnetic tape of the type employed for transducing information, and particularly to such magnetic tape having a leader for securing the magnetic tape to a reel hub.

2. Related art and Other Considerations

Manufacturers of magnetic tape cartridges (also known as magnetic tape cassettes) have historically and traditionally constructed the tape portion of the cartridge in the manner illustrated in FIG. 1. In particular, a small piece of adhesive-coated tape 20 (sometimes referred to as a "splicing tape" or "splice tape") has been used in a lap joint configuration to join magnetic tape 22 to a leader 24. The leader 24 attaches to a reel hub 26 around which the tape is to be wound.

In the prior art, the length K of the splicing tape 20 is short compared to the circumference of the reel hub 26. Unfortunately, the presence of a shorter-than-circumference splicing tape creates "bumps" B or "print-throughs" in the tape pack as shown in FIG. 2. As additional tape layers are wound on hub 26, the inward pressure increases on the inner layers, and the stress in the magnetic tape 22 at the discontinuities attributable to the splicing tape-created bumps B at the angular positions indicated by arrows 32. The stress may be high enough to create permanent deformations in the magnetic recording tape. These deformations appear as two vertical folds in the magnetic tape. The deformations remain (and can even become permanent) after the magnetic tape has been unwound from the reel hub, as illustrated by deformations 34 in FIG. 3. The permanent deformations are greatest in the first outer tape layer adjacent to the splicing tape, and can persist for many layers.

The deformations occasioned by the prior art splicing tape create an undesired signal losses when a transducing head attempts to record or reproduce information with respect to the magnetic tape. The signal losses are attributable, at least in part, to the increased head-to-tape spacing with both helical and longitudinal recording methods. Areas of the magnetic tape having the permanent deformations may be rendered unusable.

What is needed, therefore, and an object of the present invention, is a way to minimize or counteract the deformations occasioned by a splicing tape which joins magnetic recording tape to a leader or trailer.

BRIEF SUMMARY OF THE INVENTION

A pack of magnetic recording tape comprises a splicing tape which adheres a web of magnetic tape to a leader. The leader attaches to a reel hub around which the tape is to be wound. The length L of the splicing tape in a direction parallel to an elongate dimension of the magnetic tape is on the order of $N\pi D$, where D is the diameter of the reel hub and N is an integer. In one embodiment, the length L of the splicing tape is just slightly less than the circumference of the reel hub.

The present invention provides a tape assembly having a combination of magnetic tape, a leader, and a splicing tape that greatly reduces the amount of permanent tape deformation, and provides a more efficient tape pack with smaller discontinuities. Consequentially, the stress on the magnetic tape is greatly reduced, which reduces the amount of permanent deformation and the number of magnetic tape layers that are affected by the deformations. This minimizes the area of the magnetic tape that may be rendered unusable.

The tape pack of the present invention can be utilized in a magnetic tape cassette or cartridge. The cassette or cartridge can be of a type which has both a supply reel hub and a take-up reel hub, and between which the magnetic tape extends. The splicing tape of the present invention can be utilized to secure the magnetic tape to a leader at the supply reel hub, or to a leader at the take-up reel hub, or both. Alternatively, the cassette or cartridge with which the tape pack of the present invention is operable can be a single reel cartridge.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices and methods are omitted so as not to obscure the description of the present invention with unnecessary detail.

Figure 1:
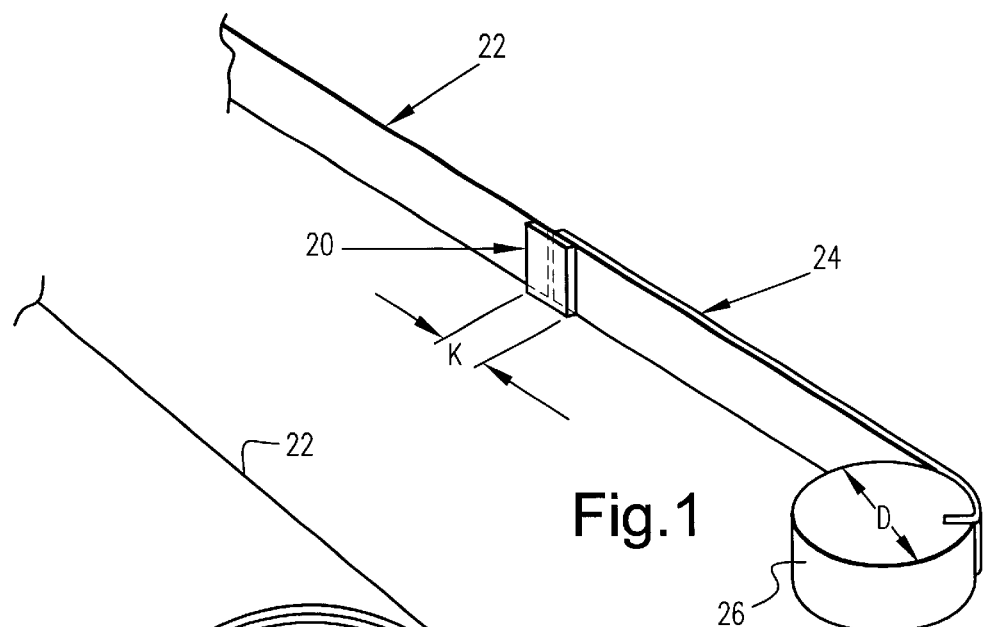
FIG. 1 is a perspective view of a portion of a prior art tape pack in an unwound state.
Figure 2:
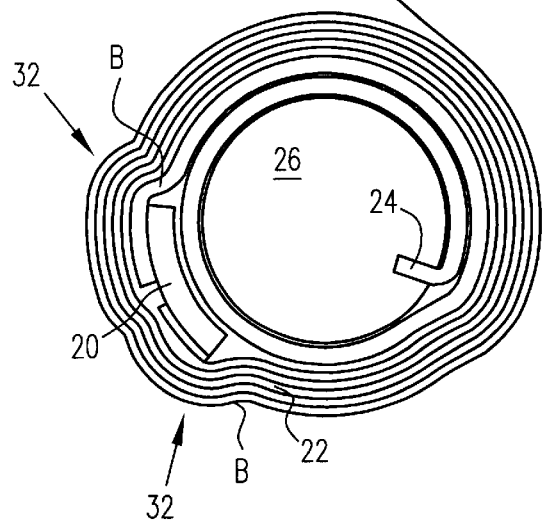
FIG. 2 is a top view of the prior art tape pack of FIG. 1 in a wound state.
Figure 3:
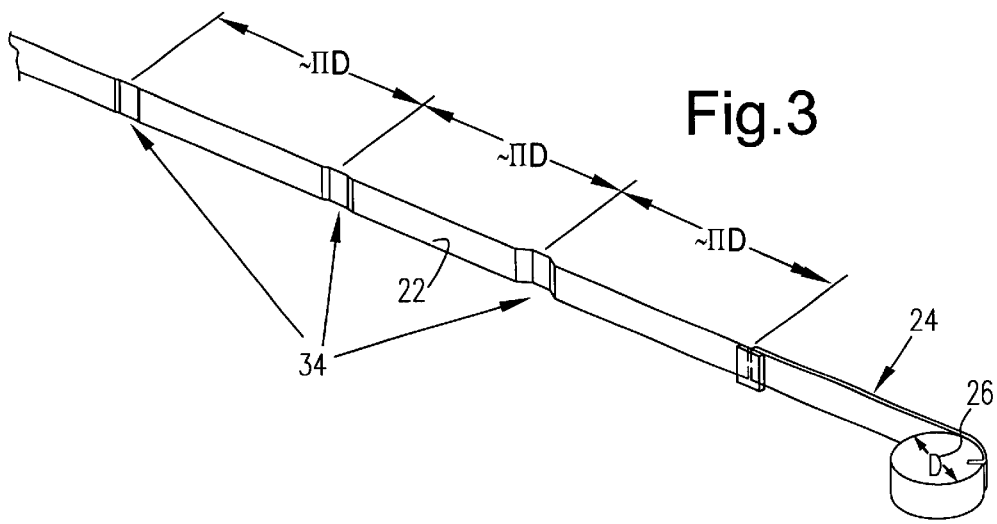
FIG. 3 is a perspective view of the prior art tape pack of FIG. 1 in an unwound state showing deformations occasioned by a prior art splicing tape.
Figure 4:
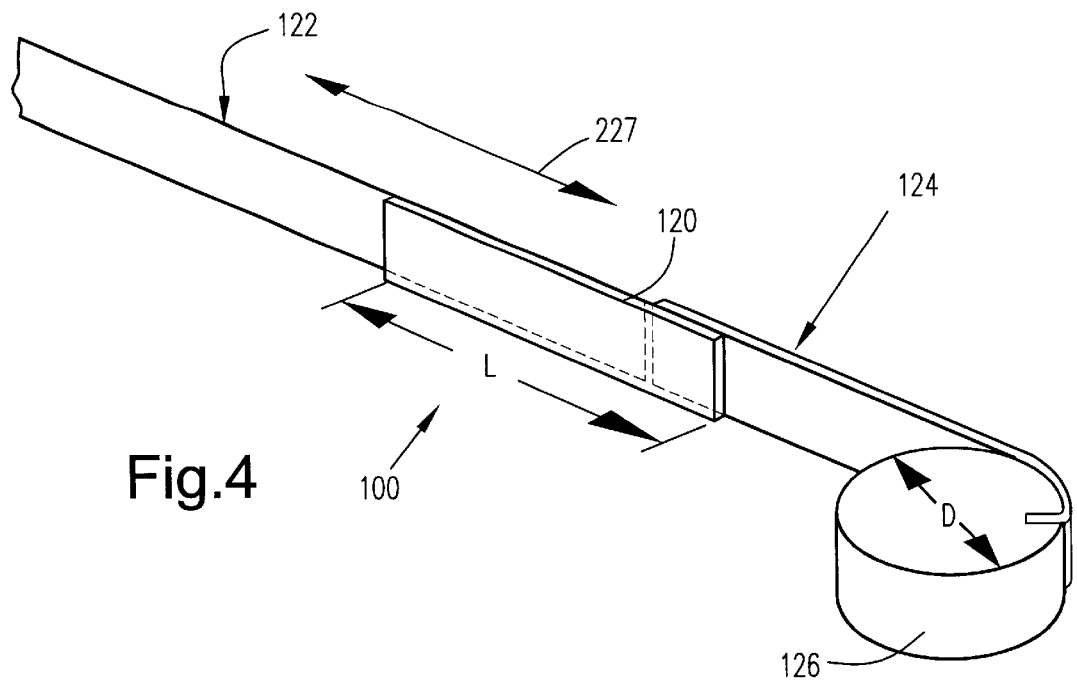
FIG. 4 is a perspective view of a portion of a tape pack in an unwound state according to an embodiment of the present invention.

FIG. 4 shows a portion of a tape pack 100 according to an embodiment of the present invention. In tape pack 100, a splicing tape 120 adheres a web of magnetic tape 122 to a leader 124. In conventional fashion, leader 124 attaches to a reel hub 126 around which the tape is to be wound. The magnetic tape 122, and thus tape pack 100 generally, extends in an elongated dimension indicated by arrow 127.

In terms of the present invention, the term "leader" includes a web which, via the connection of splicing tape 120, secures the magnetic tape 122 to either of a supply reel hub or a take-up reel hub, e.g., of a cartridge or cassette. Thus, the term "leader" is employed generically with respect to attachment to any particular hub, and to encompass a "trailer".

Figure 5:
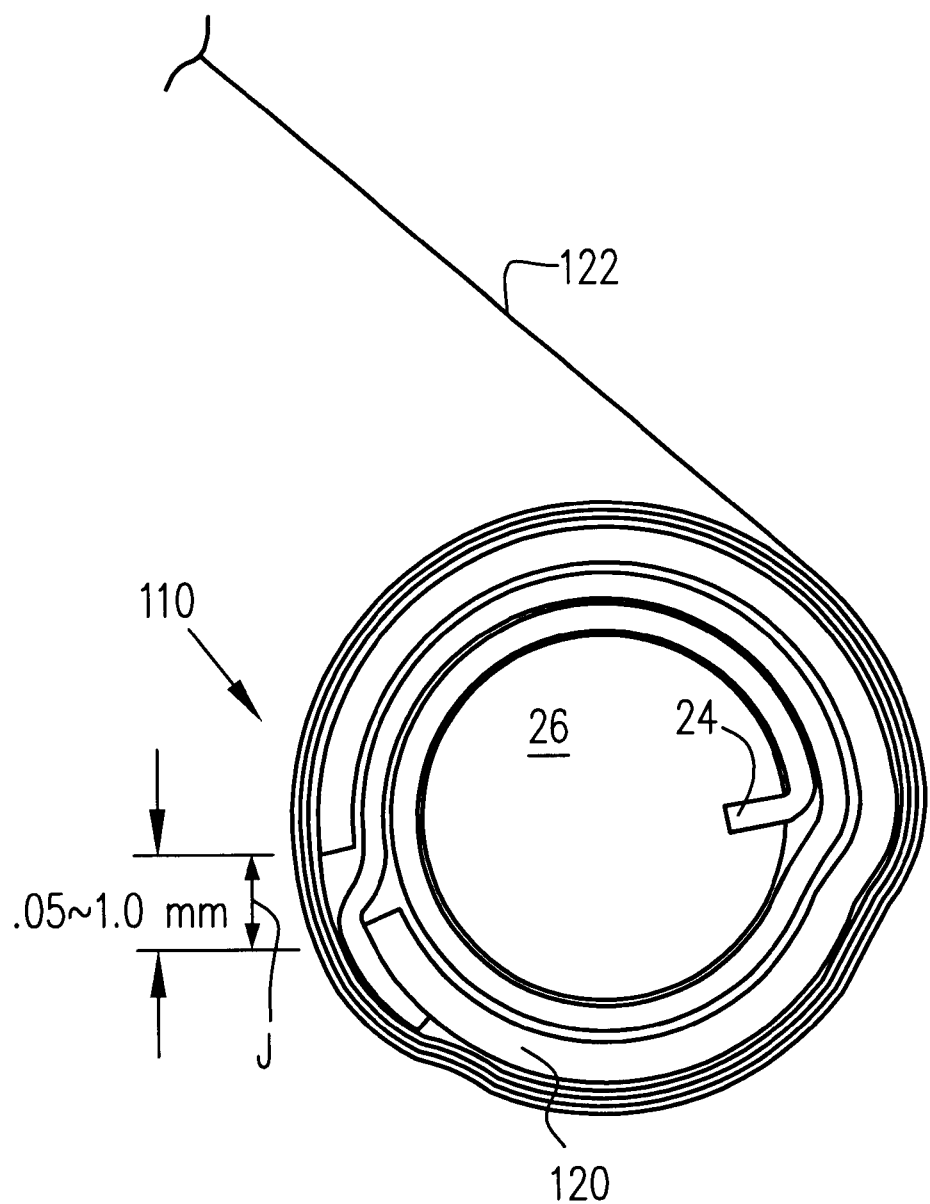
FIG. 5 is a perspective view of the tape pack of FIG. 4 in a wound state.

In contrast to the prior art, the length L of splicing tape 120 (in a direction parallel to the elongate dimension 127 of magnetic tape 122) is on the order of NπD, where D is the diameter of reel hub 126 and N is an integer. By "on the order of" it is to be understood that the length L need not exactly be NπD, but can be slightly shorter by a distance J, J being chosen to minimize the tape pack deformations of the prior art. Preferably J is between 0.05 mm and 1.0 mm. FIG. 5 shows tape pack 100 in a wound configuration. In one embodiment, the length L of splicing tape 120 is just slightly less than the circumference of reel hub 126, e.g., between 0.05 mm and 1.0 mm less than 1πD.

The present invention thus provides a tape assembly having a combination of magnetic tape, leader, and splicing tape that greatly reduces the amount of permanent tape deformation, so that less area of the magnetic tape is rendered unusable. The present invention increases the length of the splicing tape as compared to the prior art, so that in one embodiment the length L of splicing tape 120 is just slightly less than the circumference of reel hub 126. When a tape assembly in accordance with the present invention is wound onto reel hub 126, the leader 124, splicing tape 120, and magnetic tape 122 form a more efficient tape pack with smaller discontinuities. Consequentially, the stress on the magnetic tape 122 is greatly reduced, which reduces the amount of permanent deformation and the number of magnetic tape layers that are affected by the deformations. This minimizes the area of the magnetic tape 122 that may be rendered unusable.

Figure 6:
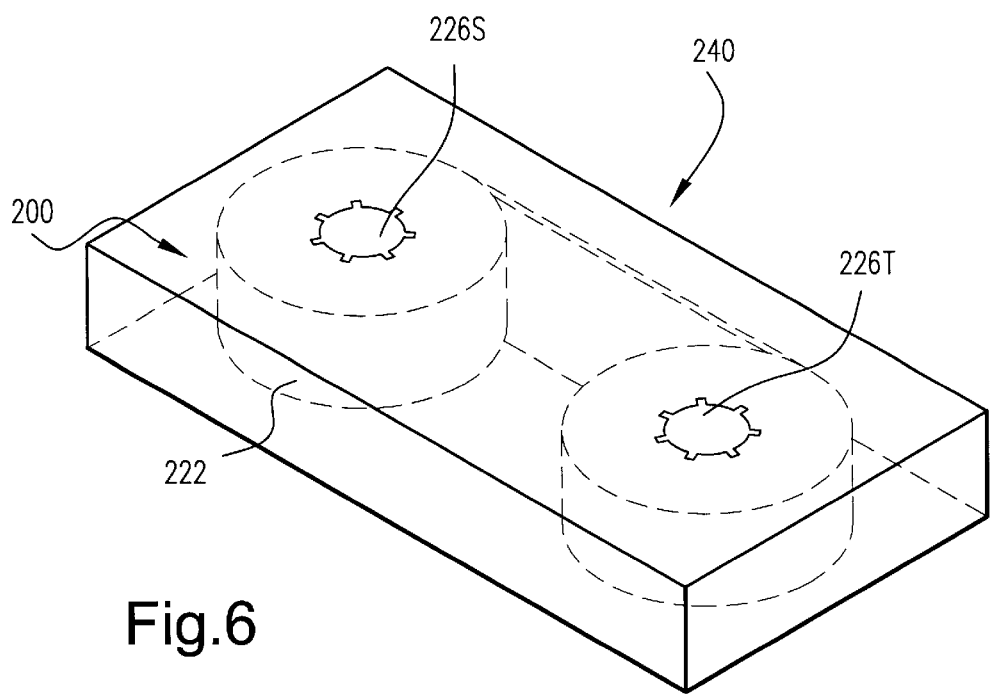
FIG. 6 is a perspective view of a magnetic tape cassette or cartridge which contains the tape pack of FIG. 5.

FIG. 6 shows an example magnetic tape cassette or cartridge 140 in which the tape pack 100 can be included. The cassette or cartridge 140 has both a supply reel hub 126S and a take-up reel hub 126T, between which the magnetic tape 122 extends. The supply reel hub 126S and take-up reel hub 126T are rotatably mounted within cassette or cartridge 140. The splicing tape 120 of the present invention can be utilized to secure the magnetic tape 122 to a leader at the supply reel hub 126S, or to a leader at the take-up reel hub 126T, or both. The cassette or cartridge 140 with which the tape pack 100 of the present invention is operable can be any conventional two-reel cartridge, including any of those subject to various existing standards and commercially marketed products. For sake of simplicity, various features of such cassettes or cartridges are not illustrated in FIG. 6, such as exterior and interior features including such aspects as cartridge lids, notches, and various windows and/or sensing apertures.

The cassette or cartridge 140 with which the tape pack 100 of the present invention is usable need not be a dual reel hub cartridge, but instead can be a single reel hub cartridge such as those conventionally available. For example, such a single reel cartridge would have a machine or otherwise engageable leader provided at the end of its tape pack which is not attached to a reel hub.

The magnetic tape 122 need not be any specific size or dimension of tape, but can be employed with any such tape of which 8 mm magnetic recording tape is but one example. Nor is the ultimate use of the magnetic tape necessarily germane to the present invention, as the tape can be utilized for recording/reproducing various types of information, such as computer data (e.g., computer back-up) and/or audio or video.

The term "leader" as employed herein can refer to any web which is employed for securing a magnetic tape to a reel hub. Thus, it makes no difference for the present invention whether the leader is positioned before the beginning of the magnetic tape (e.g., upstream with respect to the physically earliest recording positions) or after the end of the magnetic tape. While the leader may be formed of transparent material, the composition and properties of the leader are not significant for the purposes of the present invention.

The present invention encompasses any orientation of the splicing tape, e.g., orientations in which the ends of the splicing tape are essentially vertical (e.g., orthogonal to the elongated edges of the magnetic tape 122), and orientations in which the ends of the splicing tape are essentially non-orthogonal to the elongated edges of the magnetic tape (e.g., oriented to be substantially parallel to a helical scan data track to be transduced [e.g., recorded or reproduced] on the magnetic tape. In this regard, see simultaneously-filed U.S. patent application Ser. No. 09/617,506, entitled "MAGNETIC TAPE SPLICING FOR REDUCING TAPE PACK DISTORTION" which is incorporated herein by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pack of magnetic recording tape comprising:
    a reel hub;
    a leader secured to the reel hub;
    a web of magnetic recording tape having an elongated dimension;
    a splicing tape which secures the web to the leader, the splicing tape having a length L parallel to the elongate dimension of the web, the length L being on the order of NπD, where D is the diameter of the reel hub and N is an integer.

2. The pack of claim 1, wherein the length L is between NπD and NπD-J, and where J is chosen to minimize tape pack deformation.

3. The pack of claim 2, wherein J is between 0.05 mm and 1.0 mm.

4. A cassette of magnetic recording tape comprising:
    a cassette housing;
    a reel hub rotatably mounted in the cassette housing;
    a leader secured to the reel hub;
    a web of magnetic recording tape having an elongated dimension;
    a splicing tape which secures the web to the leader, the splicing tape having a length L parallel to the elongate dimension of the web, the length L being on the order of NπD, where D is the diameter of the reel hub and N is an integer.

5. The cassette of claim 4, wherein the length L is between NπD and NπD-J, and where J is chosen to minimize the tape pack deformation.

6. The pack of claim 5, wherein J is between 0.05 mm and 1.0 mm.

7. The cassette of claim 4, wherein the cassette has two reel hubs, and wherein the leader is secured to a first of the reel hubs.

* * * * *